US010226865B2

(12) United States Patent
Nakayama

(10) Patent No.: US 10,226,865 B2
(45) Date of Patent: Mar. 12, 2019

(54) GRIPPER AND ROBOT SYSTEM

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/901,113

(22) Filed: Feb. 21, 2018

(65) Prior Publication Data

US 2018/0297200 A1    Oct. 18, 2018

(30) Foreign Application Priority Data

Apr. 12, 2017  (JP) ................................. 2017-078612

(51) Int. Cl.
*B25J 9/16*   (2006.01)
*B25J 13/08*  (2006.01)
(Continued)

(52) U.S. Cl.
CPC .......... *B25J 9/1612* (2013.01); *B25J 9/1669* (2013.01); *B25J 9/1697* (2013.01); *B25J 13/088* (2013.01);
(Continued)

(58) Field of Classification Search
CPC ...... B25J 9/1612; B25J 9/1669; B25J 9/1697; B25J 13/088; B25J 15/0028;
(Continued)

(56) References Cited

U.S. PATENT DOCUMENTS 4,828,304 A * 5/1989 No ....................... B25J 15/0616
294/106
5,232,332 A    8/1993 Focke
(Continued)

FOREIGN PATENT DOCUMENTS

EP    3020515 A1    5/2016
FR    2617078 A1 * 12/1988  .......... B25J 15/0616
(Continued)

OTHER PUBLICATIONS

Office Action dated Dec. 4, 2018 in corresponding Japanese Application No. 2017-078612; 7 pages including English-language translation.

*Primary Examiner* — Dean J Kramer
(74) *Attorney, Agent, or Firm* — Maier & Maier, PLLC

(57) ABSTRACT

A gripper includes: a base attached to a wrist tip of a robot, a first-surface suction unit provided on the base and capable of sucking a first surface of a box-shaped package in a first suction direction, and a second-surface support unit configured to contact and support a second surface of the package orthogonal to the first surface. The gripper further includes a moving mechanism configured to move the second-surface support unit along a plane parallel to the second surface between a position where the second-surface support unit is retracted toward a base end side of relative to a leading end of the first-surface suction unit in the first suction direction and a position where the second-surface support unit is placed forward from the leading end of the first-surface suction unit while the first-surface suction unit is sucking the first surface.

4 Claims, 14 Drawing Sheets

(51) Int. Cl.
*B25J 15/06* (2006.01)
*B65G 47/91* (2006.01)
*B25J 15/00* (2006.01)

(52) U.S. Cl.
CPC ....... *B25J 15/0028* (2013.01); *B25J 15/0061* (2013.01); *B25J 15/0616* (2013.01); *B65G 47/918* (2013.01); *Y10S 901/09* (2013.01); *Y10S 901/31* (2013.01); *Y10S 901/40* (2013.01); *Y10S 901/47* (2013.01)

(58) Field of Classification Search
CPC  B25J 15/0052; B25J 15/0061; B25J 15/0616; B66C 1/0237; B66C 1/0243; B66C 1/0281; B65G 47/918; Y10S 901/09; Y10S 901/31; Y10S 901/40; Y10S 901/47
USPC ......................................................... 294/65
See application file for complete search history.

(56) References Cited

U.S. PATENT DOCUMENTS

| | | | | |
|---|---|---|---|---|
| 6,652,014 | B2* | 11/2003 | Schmalz | B65G 47/91 294/65 |
| 7,044,706 | B2* | 5/2006 | Jung | B25J 15/0052 294/119.1 |
| 7,134,833 | B2* | 11/2006 | de Koning | B65G 47/91 414/753.1 |
| 8,162,362 | B2* | 4/2012 | Braunschweiger | B65G 61/00 294/188 |
| 8,473,094 | B2* | 6/2013 | Becker | B65G 47/918 294/65 |
| 9,498,887 | B1* | 11/2016 | Zevenbergen | B25J 15/0616 |
| 2014/0179501 | A1* | 6/2014 | Akama | B25J 9/0096 493/162 |
| 2016/0137435 | A1 | 5/2016 | Tanaka et al. | |

FOREIGN PATENT DOCUMENTS

| | | |
|---|---|---|
| GB | 2231020 A | 11/1990 |
| JP | S60-114483 A | 6/1985 |
| JP | H03-088624 A | 4/1991 |
| JP | H06-57577 U | 8/1994 |
| JP | H10-87074 A | 4/1998 |
| JP | H11-885 A | 1/1999 |
| JP | 2000-255965 A | 9/2000 |
| JP | 2001-72247 A | 3/2001 |
| JP | 2016-94280 A | 5/2016 |
| JP | 5957295 B2 | 7/2016 |

* cited by examiner

GRIPPER AND ROBOT SYSTEM

CROSS-REFERENCE TO RELATED APPLICATIONS

This application is based on and claims priority to Japanese Patent Application No. 2017-078612 filed on Apr. 12, 2017, the entire content of which is incorporated herein by reference.

FIELD

The present invention relates to a gripper and a robot system.

BACKGROUND

Conventionally, a gripper having suction pads capable of sucking two orthogonal surfaces of a package from two directions and a linear moving mechanism configured to move the suction pads linearly is known (refer to Japanese Unexamined Patent Application, Publication No. 2016-94280, for example).

With this gripper, the package can be sucked by actuating the suction pads after the linear moving mechanism moves the suction pads so that the suction pads in the two directions are each positioned close to the two orthogonal surfaces of the package.

SUMMARY

A gripper according to an aspect of the present disclosure includes a base to be attached to a wrist tip of a robot, a first-surface suction unit provided on the base and capable of sucking a first surface of a box-shaped package in a first suction direction, a second-surface support unit configured to contact and support a second surface of the package orthogonal to the first surface, and a moving mechanism configured to move the second-surface support unit along a plane parallel to the second surface between a position where the second-surface support unit is retracted toward a base end side relative to a leading end of the first-surface suction unit in the first suction direction and a position where the second-surface support unit is placed forward from the leading end of the first-surface suction unit, while the first-surface suction unit is sucking the first surface.

A robot system according to another aspect of the present disclosure includes the gripper in the above description, and a robot, wherein the gripper is attached to a wrist tip of the robot through the base.

DETAILED DESCRIPTION

The following describes a gripper 3 and a robot system 1 according to an embodiment of the present invention with reference to the accompanying drawings.

Figure 1:
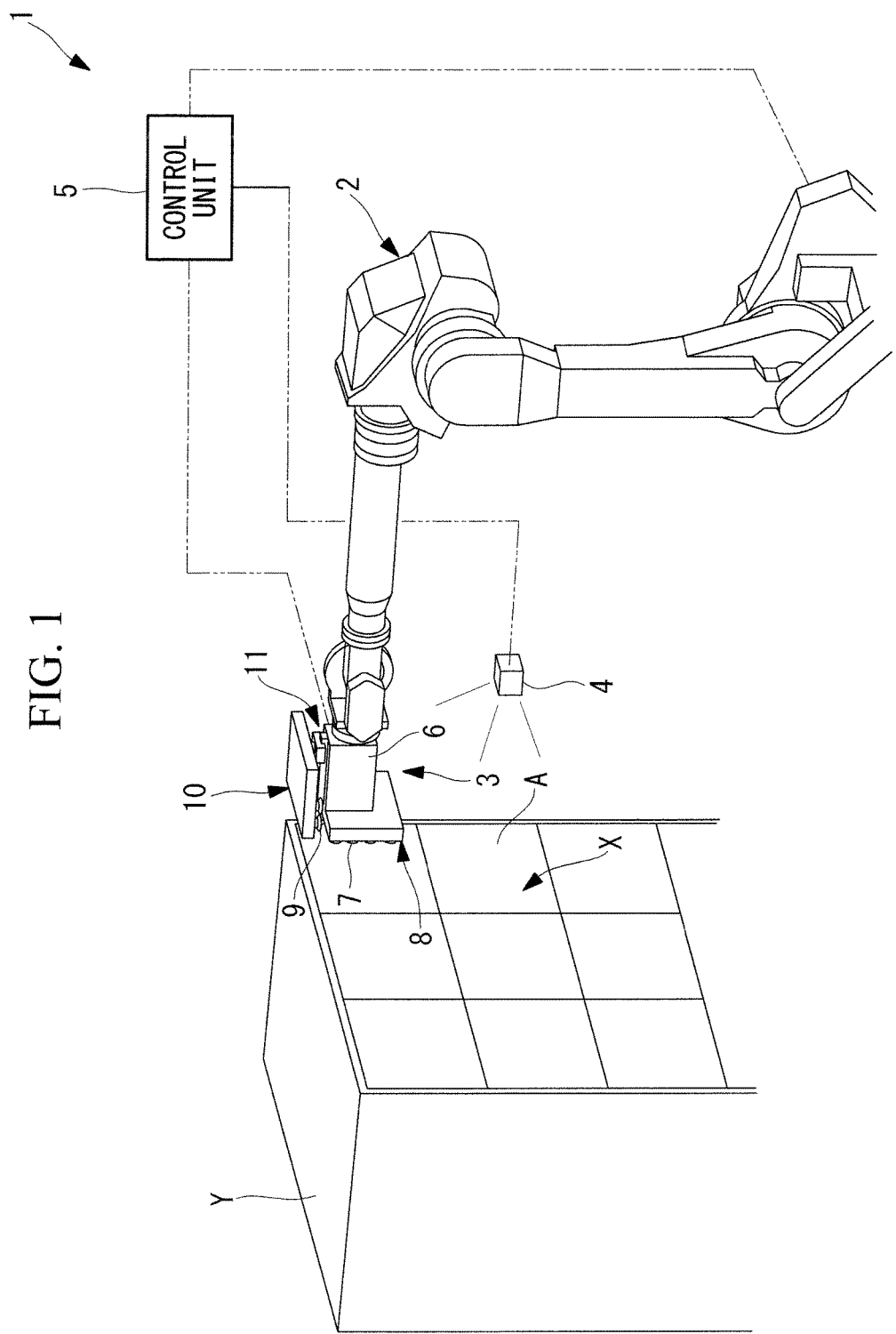
FIG. 1 is a perspective view illustrating a robot system according to an embodiment of the present invention.

As illustrated in FIG. 1, the robot system 1 according to the present embodiment includes an articulated type robot 2 disposed near a rack or container Y housing a plurality of packages X in a stack with only a vertical first surface A of each package X being exposed, the gripper 3 fixed to a tip of a wrist of the robot 2, a sensor 4, and a control unit 5 configured to control the robot 2 and the gripper 3 on a basis of a result of detection by the sensor 4.

The articulated type robot 2 moves the gripper 3 fixed to the wrist and places the gripper 3 at an optional position in a motion range.

Figure 2:
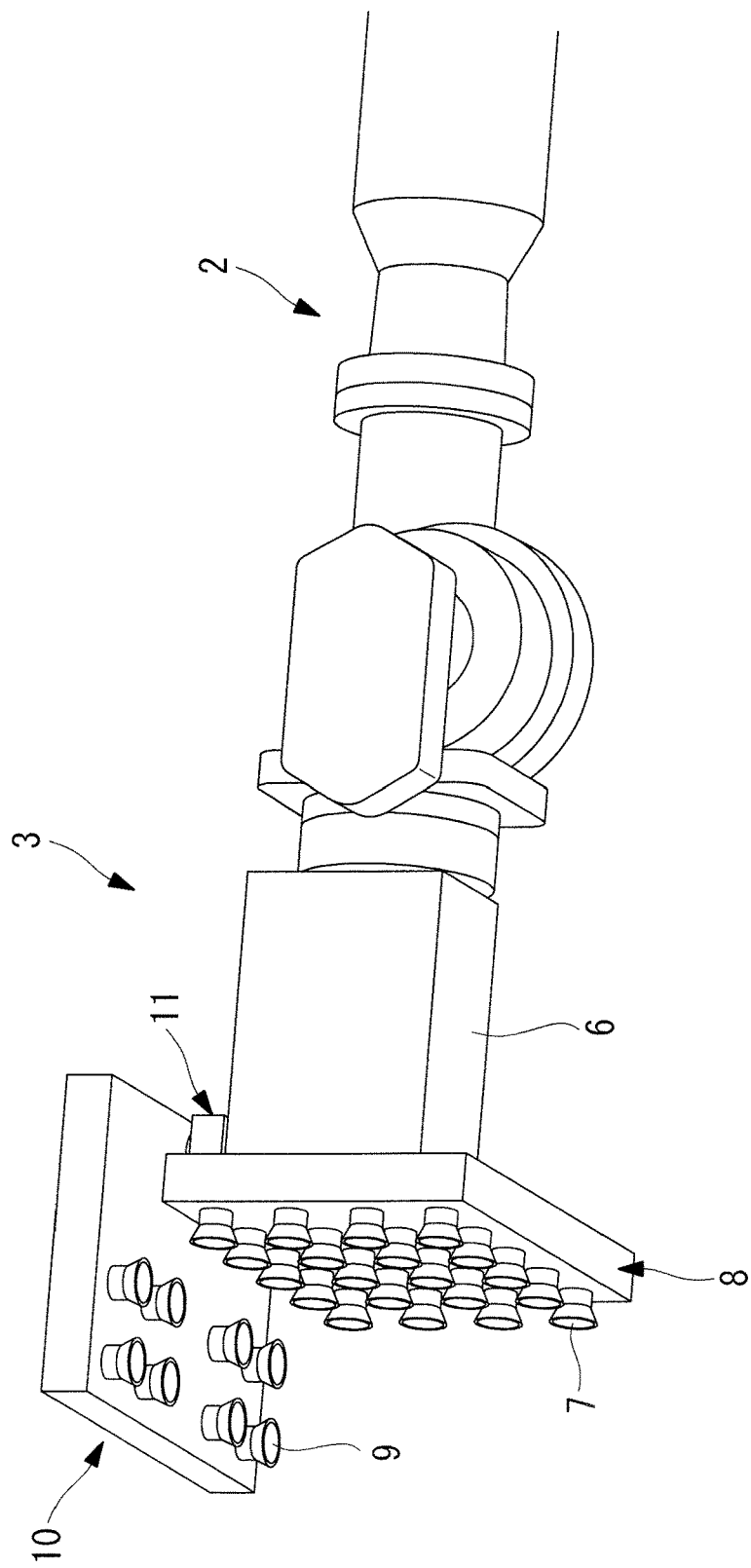
FIG. 2 is a perspective view illustrating a gripper according to the embodiment of the present invention, which is included in the robot system illustrated in FIG. 1.

As illustrated in FIG. 2, the gripper 3 according to the present embodiment includes: a base 6 attached to a wrist tip surface of the robot 2; a first-surface suction unit 8 fixed to the base 6, including a plurality of suction pads 7 arrayed in a plane parallel to the wrist tip surface, and capable of sucking in a first suction direction orthogonal to the wrist tip surface; a second-surface suction unit (second-surface support unit) 10 including a plurality of suction pads 9 arrayed in a plane along the first suction direction, and capable of sucking in a second suction direction orthogonal to the first suction direction; and a moving mechanism 11 configured to move the second-surface suction unit 10 relative to the base 6 in the first suction direction and the second suction direction.

Figure 3:
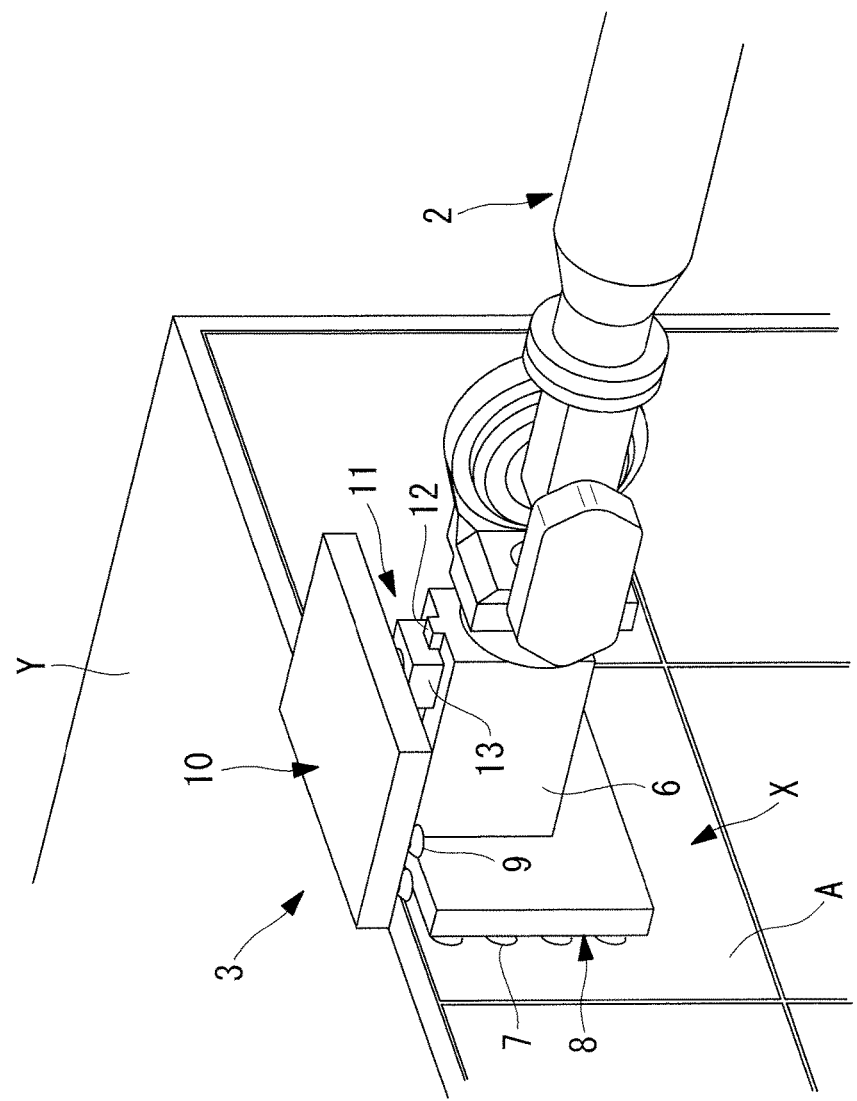
FIG. 3 is a perspective view illustrating a state in which the gripper illustrated in FIG. 2 is positioned on a first surface of a package.

As illustrated in FIG. 3, the moving mechanism 11 includes a first actuator (moving mechanism) configured to move a slider 13 linearly in the first suction direction along a guide rail 12 fixed to the base 6, and a second actuator mounted on the slider 13 and configured to move the second-surface suction unit 10 linearly in the second suction direction. The first actuator and the second actuator may be each an optional actuator such as a motor or an air cylinder. FIG. 3 integrally illustrates the slider 13 and the actuators.

Figure 4:
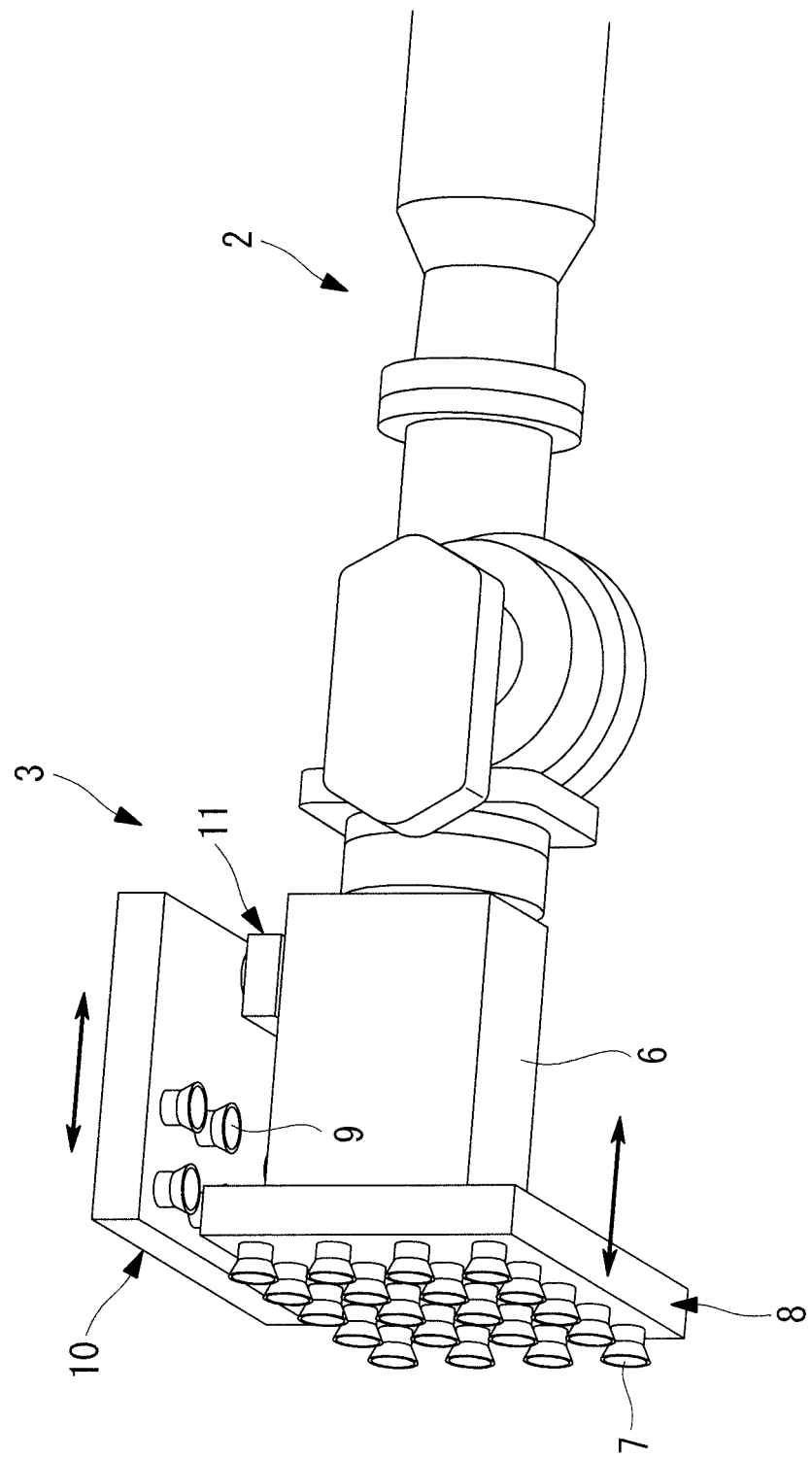
FIG. 4 is a perspective view illustrating a state in which a second-surface suction unit of the gripper illustrated in FIG. 2 is retracted to a wrist side of a first-surface suction unit.

The first actuator can move the slider 13 in the first suction direction so that the second-surface suction unit 10 mounted on the slider 13 is translated between a position where the second-surface suction unit 10 is retracted on a wrist side of the first-surface suction unit 8 as illustrated in FIG. 4, and a position where the second-surface suction unit 10 is placed forward from the first-surface suction unit 8 as illustrated in FIG. 2.

The second actuator can slightly move the second-surface suction unit 10 in the second suction direction when actuated while the slider 13 is positioned at the foremost position.

The sensor 4 is a camera attached to the robot 2 or the base 6 of the gripper 3 or attached outside of the robot 2. The sensor 4 acquires an image of a package X to be transferred, and detects the position of the first surface A of the package X to be transferred on the basis of the acquired image and the position of a second surface B thereof orthogonal to the first surface A. The sensor 4 may be a camera configured to acquire a two-dimensional image or a three-dimensional image, or may be a sensor configured to measure distance.

The control unit 5 is configured to actuate, on the basis of the position of the first surface A detected by the sensor 4, the robot 2 to move the first-surface suction unit 8 of the gripper 3 attached to the wrist tip surface closer to a predetermined position where the first-surface suction unit 8 can suck the first surface A of the package X to be transferred. The control unit 5 sequentially actuates the first-surface suction unit 8, the first actuator, the second actuator, and the second-surface suction unit 10 of the gripper 3 moved to the predetermined position by the robot 2.

Specifically, first, the control unit 5 is configured to control the first actuator to retract the second-surface suction unit 10 to the position on the wrist side of the first-surface suction unit 8 as illustrated in FIG. 4, and actuate the robot 2 to place the gripper 3 at a position where the upper surface of the first-surface suction unit 8 is substantially aligned with the position of the second surface B of the package X detected by the sensor 4 and all suction pads 7 of the first-surface suction unit 8 contact or are positioned close at a slight interval to the first surface A as illustrated in FIGS. 5 to 10.

Figure 5:
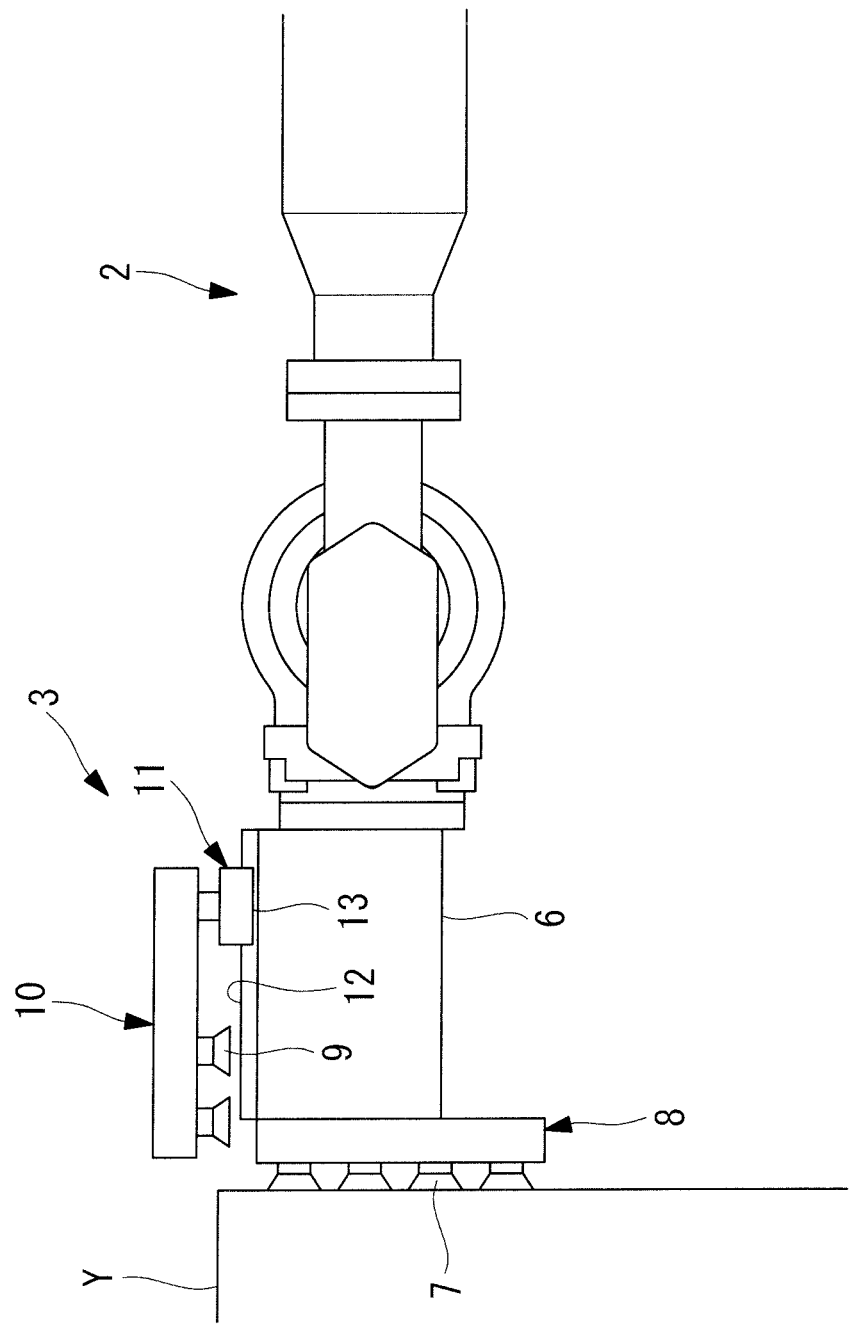
FIG. 5 is a side view illustrating the state illustrated in FIG. 3.

Then, as illustrated in FIG. 5, the control unit 5 is configured to actuate the first-surface suction unit 8 so that the first surface A of the package X is sucked by all suction pads 7.

Figure 6:
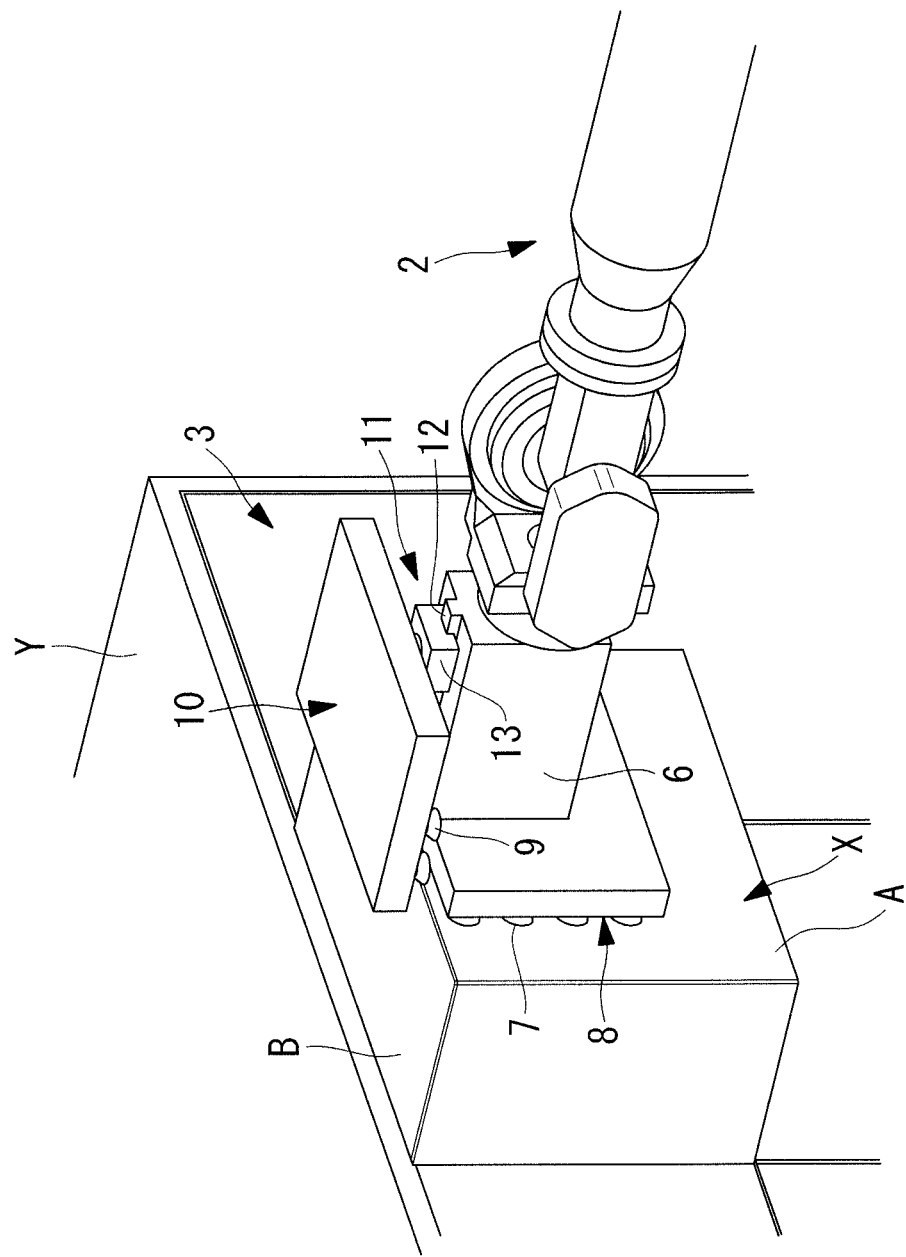
FIG. 6 is a perspective view illustrating a state in which the package sucked in the state illustrated in FIG. 3 is pulled out.
Figure 7:
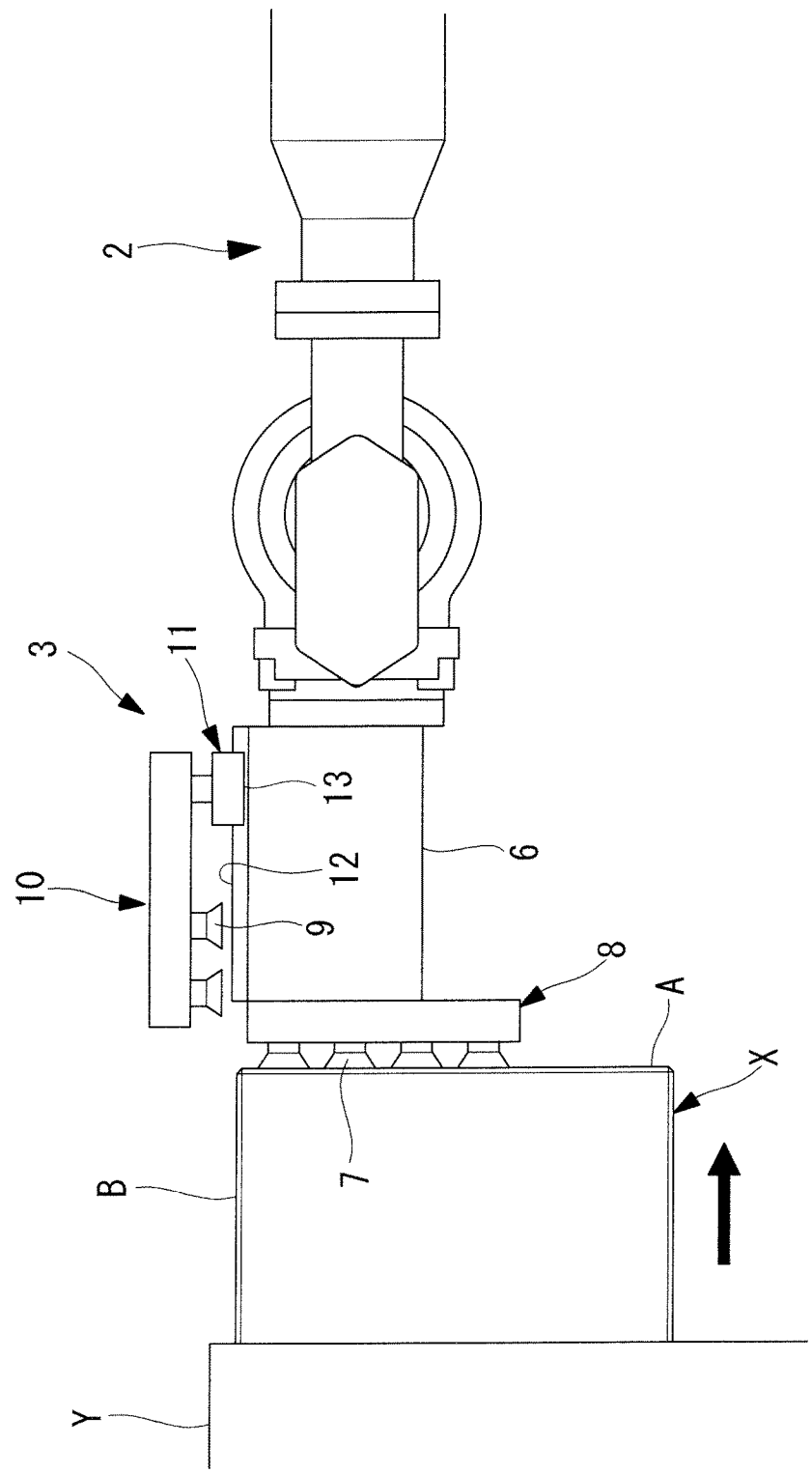
FIG. 7 is a side view illustrating the state illustrated in FIG. 6.

While the first surface A of the package X is sucked by the first-surface suction unit 8, the control unit 5 is configured to actuate the robot 2 to retract the gripper 3 straight along the first suction direction as illustrated in FIGS. 6 and 7.

Figure 8:
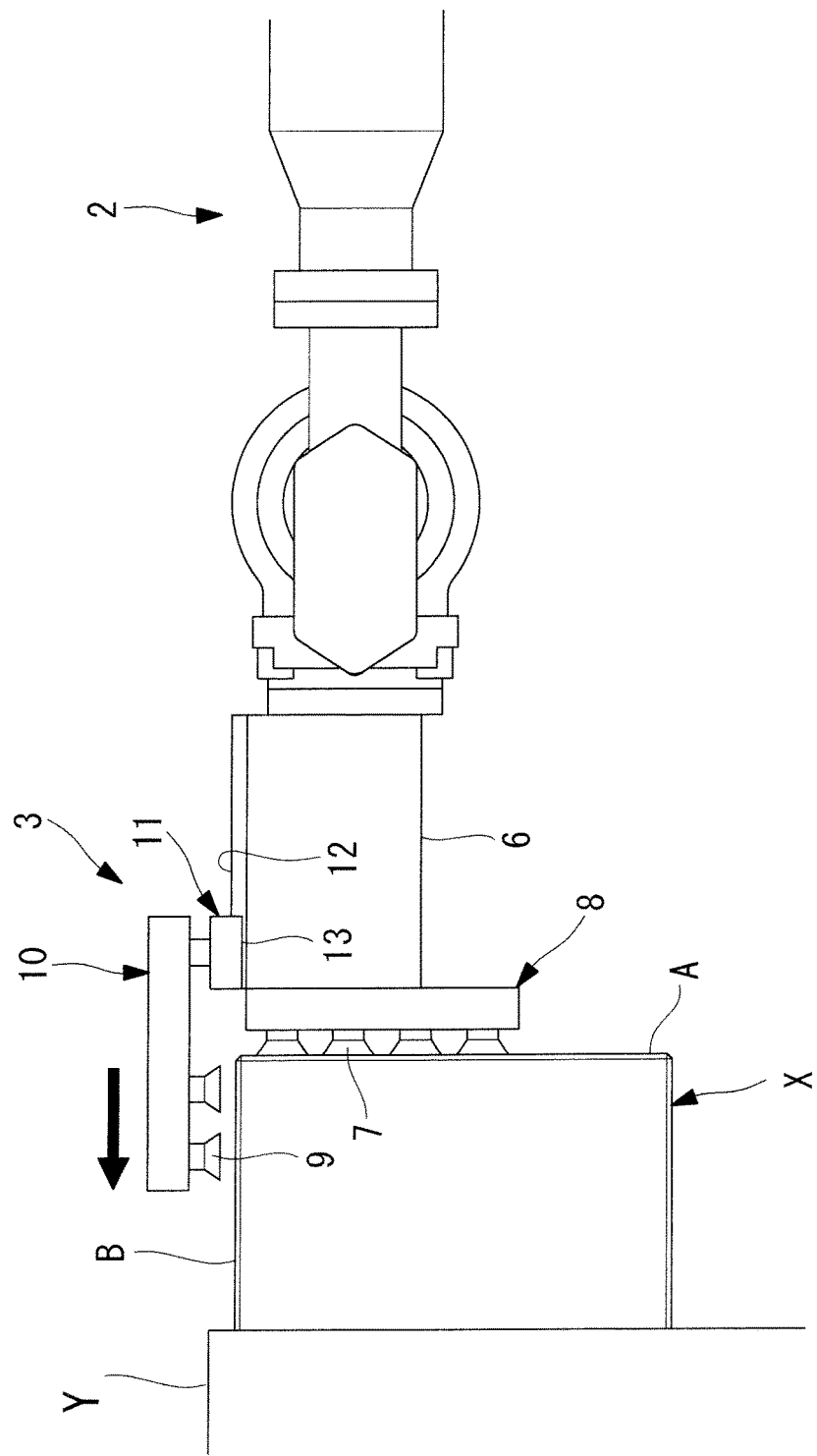
FIG. 8 is a side view illustrating a state in which the second-surface suction unit in the state illustrated in FIG. 7 is moved forward.
Figure 9:
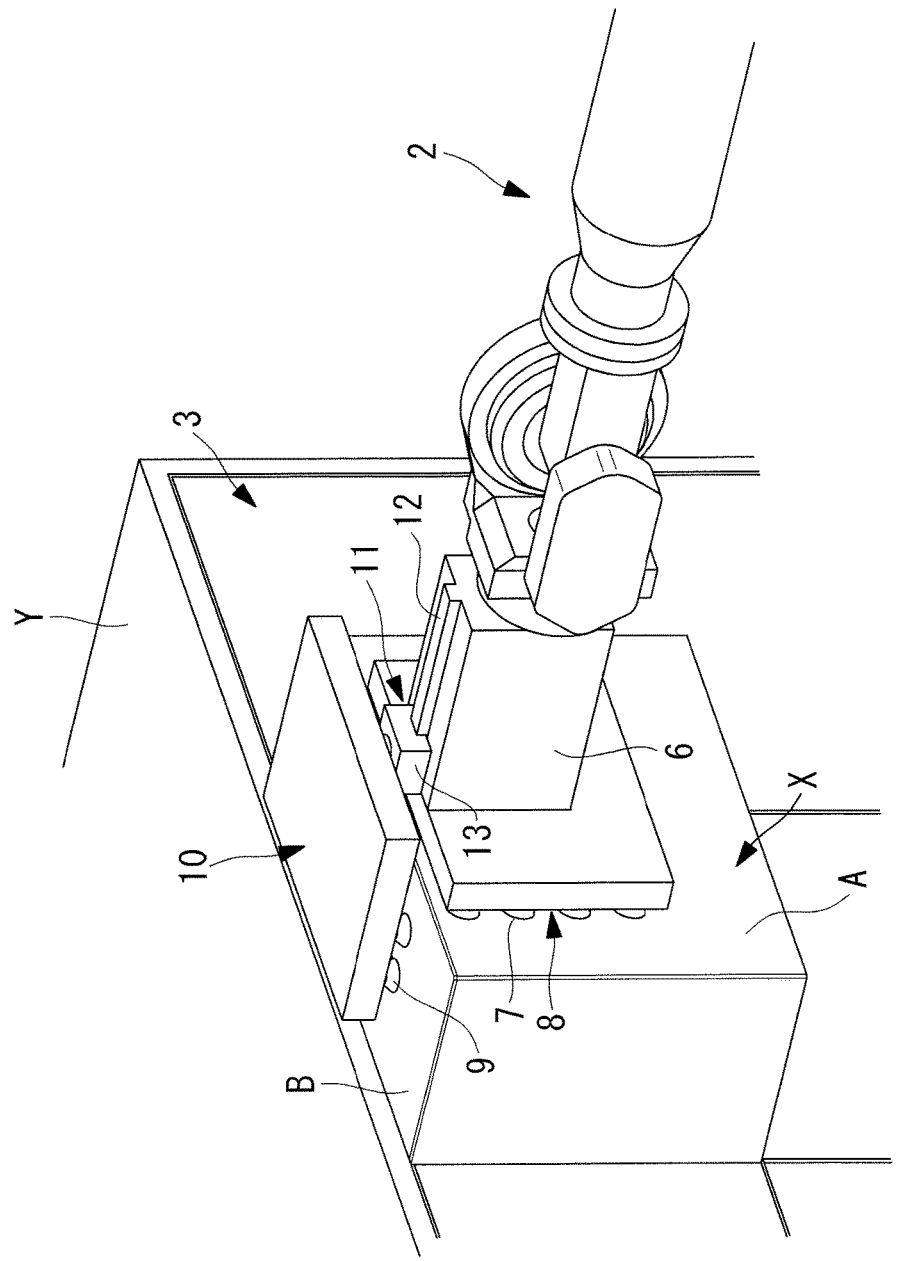
FIG. 9 is a perspective view illustrating the state illustrated in FIG. 8.

Thereafter, when the gripper 3 is in the retracted position, the control unit 5 actuates the first actuator to move the second-surface suction unit 10 forward of the first-surface suction unit 8 as illustrated in FIGS. 8 and 9.

Figure 10:
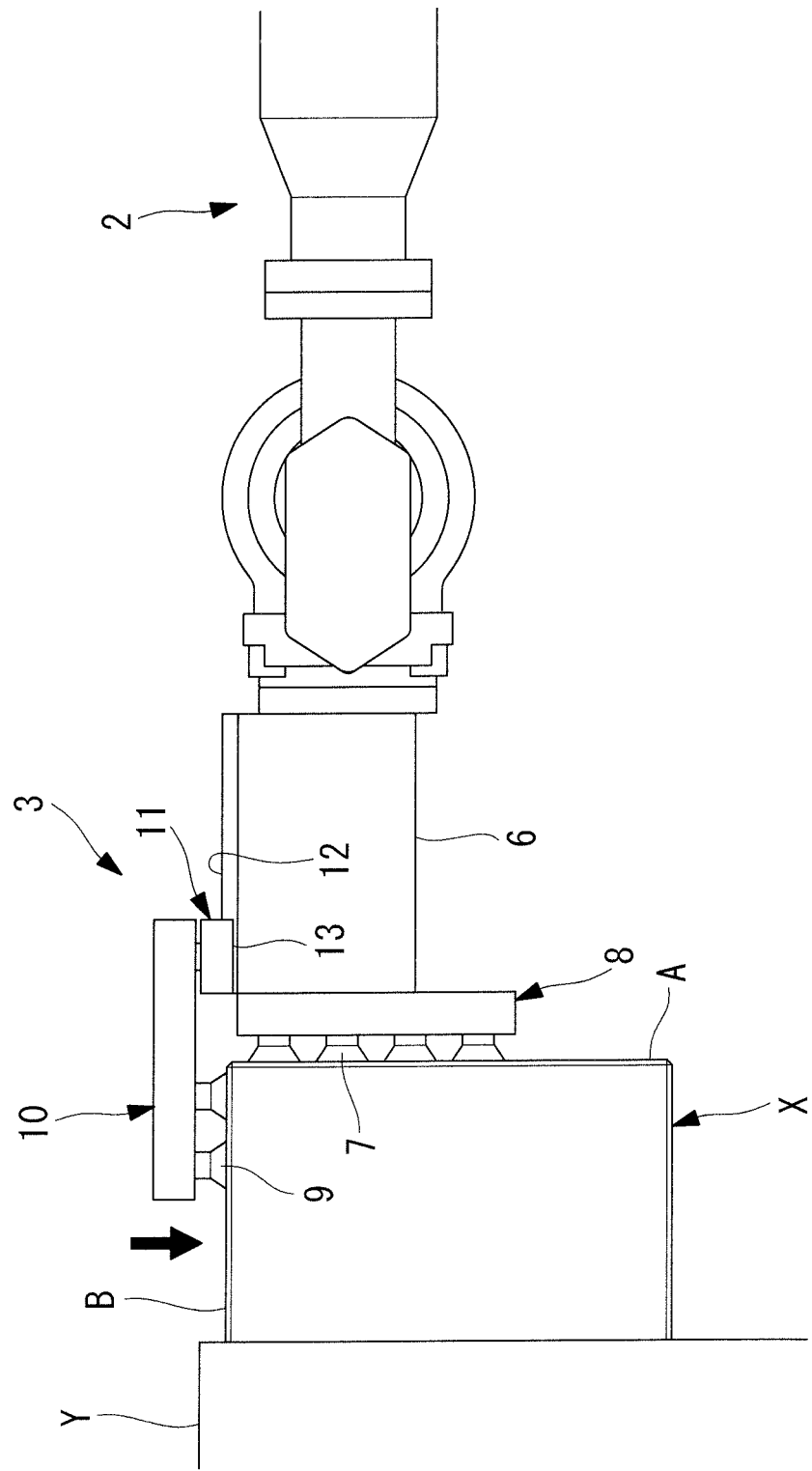
FIG. 10 is a side view illustrating a state in which the second-surface suction unit in the state illustrated in FIG. 8 is moved closer to a second surface.

Then, after the second-surface suction unit 10 is moved forward to the front position, the control unit 5 actuates the second actuator to move the second-surface suction unit 10 along the second suction direction and actuates the second-surface suction unit 10 as illustrated in FIG. 10.

The following describes operation of the gripper 3 and the robot system 1 according to the present embodiment configured as described above.

To transfer, by using the robot system 1 according to the present embodiment, a large number of box packages X stored in a stack with only the first surface A of each package on the front side being exposed in a rack or Container Y of a truck, the sensor 4 detects the positions of the first surface A and the second surface B of a package X to be transferred.

The control unit 5 actuates the first actuator of the gripper 3 to retract the second-surface suction unit 10 with respect to a front surface of the first-surface suction unit 8, and then, as illustrated in FIGS. 3 and 5, actuates the robot 2 on the basis of a result of the detection by the sensor 4 to move the gripper 3 attached to the wrist tip surface closer to the package X to be transferred. Then, the control unit 5 actuates the first-surface suction unit 8 to suck the first surface A of the package X while the suction pads 7 provided on the first-surface suction unit 8 of the gripper 3 are positioned where the suction pads 7 can suck predetermined places of the first surface A of the package X.

Subsequently, while maintaining the state in which the first surface A is sucked by the gripper 3, the control unit 5 actuates the robot 2 to retract the entire gripper 3 linearly along the first suction direction by a predetermined distance as illustrated in FIGS. 6 and 7. Accordingly, the package X to be transferred is pulled out toward the closer side by the gripper 3 so that an upper surface (the second surface B) thereof orthogonal to the first surface A is exposed to the outside.

In this state, as illustrated in FIGS. 8 and 9, the control unit 5 actuates the first actuator to move forward the second-surface suction unit 10 along a plane parallel to the second surface B so that the suction pads 9 of the second-surface suction unit 10 face the second surface B of the package X. Then, at this position, the control unit 5 actuates the second actuator to move the suction pads 9 of the second-surface suction unit 10 closer to the second surface B of the package X as illustrated in FIG. 10, and actuates the second-surface suction unit 10 to suck the second surface B.

In this manner, the gripper 3 can suck the first surface A and the second surface B of the package X, which are orthogonal to each other, and the package X can be firmly gripped and transferred. Since the second-surface suction unit 10 is moved along the plane parallel to the second surface B, it is possible to reduce the interference range when the second-surface suction unit 10 moves. In other words, the second-surface suction unit 10 does not move in a direction orthogonal to the second surface B, and thus, when there is an object (for example, ceiling) near the second surface B with a small space therebetween, the second surface can be reliably sucked by the second-surface suction unit 10, and picking of the box-shaped package X can be easily performed.

As described above, in the gripper 3 and the robot system 1 according to the present embodiment, the second-surface suction unit 10 can be arranged in a retracted state at a position in the rear of the suction pads 7 of the first-surface suction unit 8, and thus, without being interfered by the second-surface suction unit 10, the first-surface suction unit 8 can suck the first surface A of the package X with only the first surface A being exposed. Then, the second surface B can be exposed by retracting the package X, the first surface A of which is being sucked, in the first suction direction to pull the package X out from the other packages X.

In addition, after the first surface A is sucked by the first-surface suction unit 8, the second-surface suction unit 10 is moved forward linearly in the first suction direction to face toward the second surface B being exposed. Thus, the second surface B can be sucked when there is no large space around the second surface B.

Although the present embodiment exemplarily describes the case in which a package X stored in a rack or Container Y having opening in the side direction is handled and the first surface A is a vertical side surface closer to the robot 2, the present invention is not limited thereto. When a package X stored in a container opened upward is handled, an upper surface exposed upward may be sucked as the first surface A.

Although an upper surface adjacent to the first surface A is exemplarily described as the second surface B orthogonal to the vertical first surface A, a lower surface adjacent to the first surface A may be supported.

The second actuator configured to move the second-surface suction unit 10 closer to the second surface B does not need to be provided as long as the first-surface suction unit 8 can suck the first surface A at a position where the suction pads 9 of the second-surface suction unit 10 do not contact the second surface B but can suck the second surface B.

In the present embodiment, positioning of the first-surface suction unit 8 with respect to the first surface A is performed by actuation of the robot 2. However, another actuator configured to move the first-surface suction unit 8 forward and backward may be provided on the base 6 so that the first-surface suction unit 8 is roughly positioned through actuation of the robot 2 and then positioned by the other actuator to have an optimum gap between the first surface A and the suction pads 7. After being sucked by the first-surface suction unit 8, the box-shaped package X may be pulled to the front side by another actuator configured to operate the first-surface suction unit 8 forward and backward, instead of the robot 2.

Figure 11:
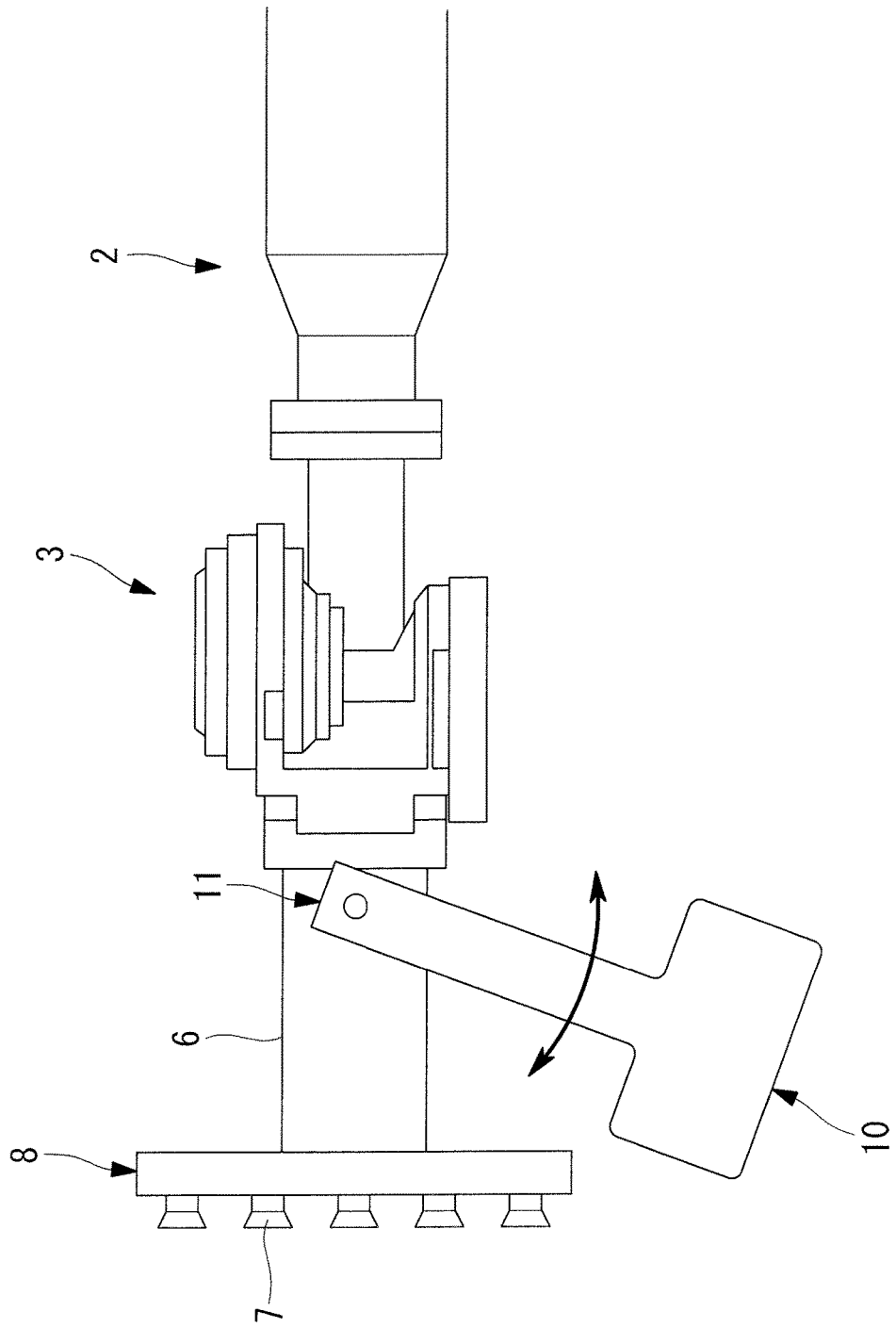
FIG. 11 is a plan view illustrating a modification of the gripper illustrated in FIG. 2.
Figure 12:
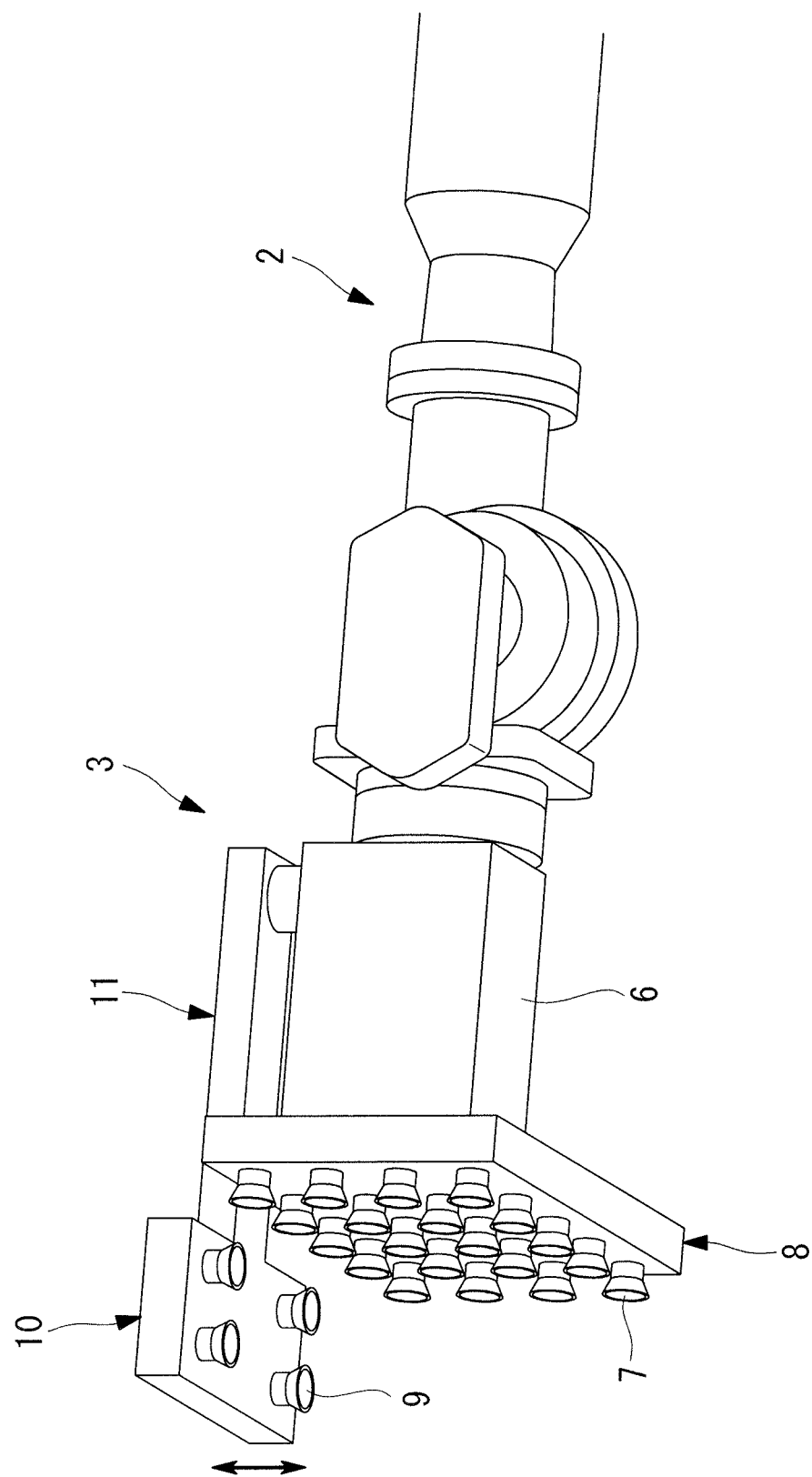
FIG. 12 is a perspective view of the gripper illustrated in FIG. 11.

In the above description, the first actuator configured to advance and retract the second-surface suction unit 10 relative to the first-surface suction unit 8 moves the slider 13 linearly on the guide rail 12 has been exemplified. Instead, as illustrated in FIGS. 11 and 12, the first actuator that rotates the second-surface suction unit 10 along a plane parallel to the second surface B about an axis extending in parallel to the second suction direction relative to the base 6 may be employed. With this configuration, the second-surface suction unit 10 can be disposed at a position where the second-surface suction unit 10 does not interfere with suction of the first surface A by the first-surface suction unit 8, and can be positioned facing the second surface B in a small space as necessary.

Figure 13:
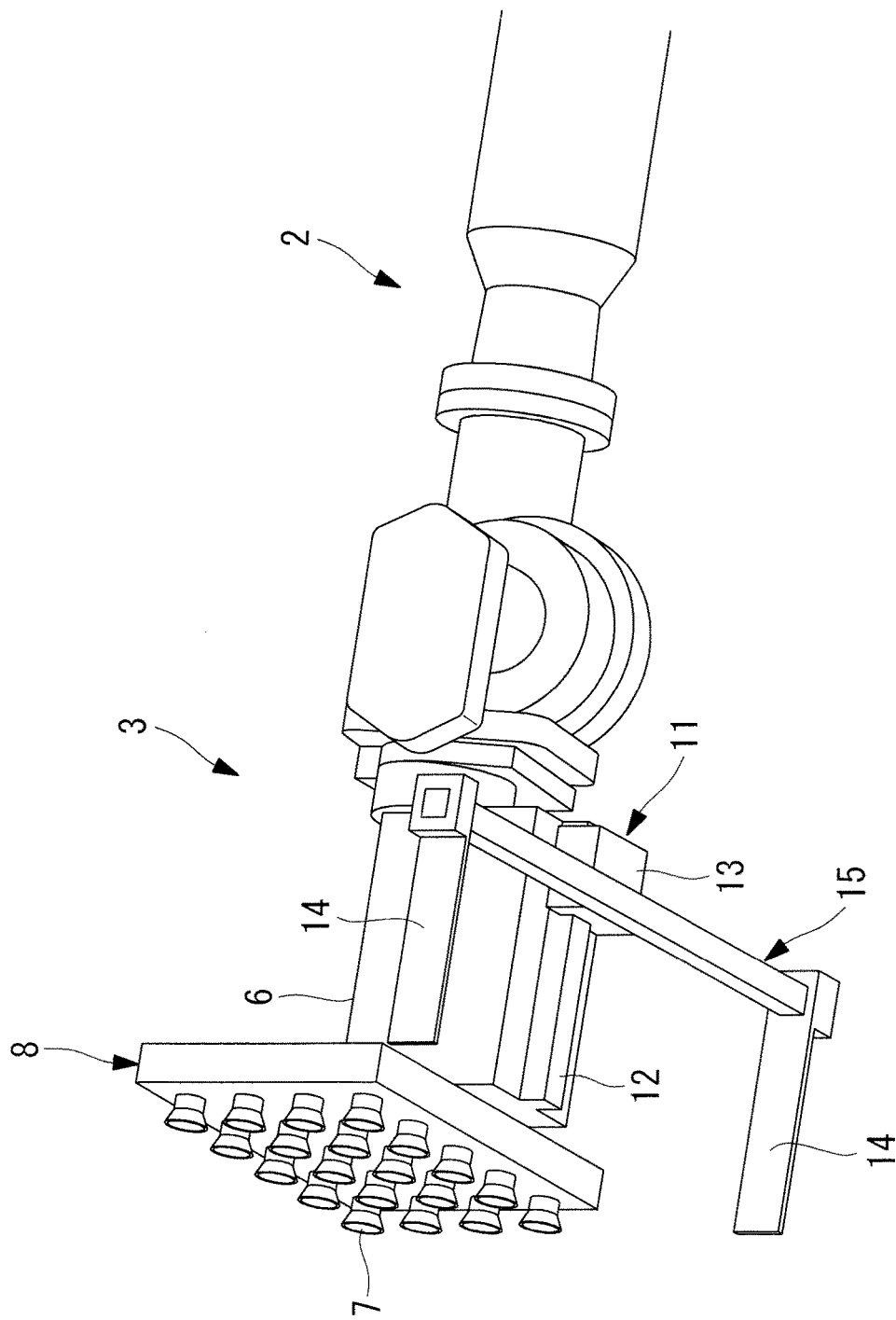
FIG. 13 is a perspective view illustrating another modification of the gripper illustrated in FIG. 2.
Figure 14:
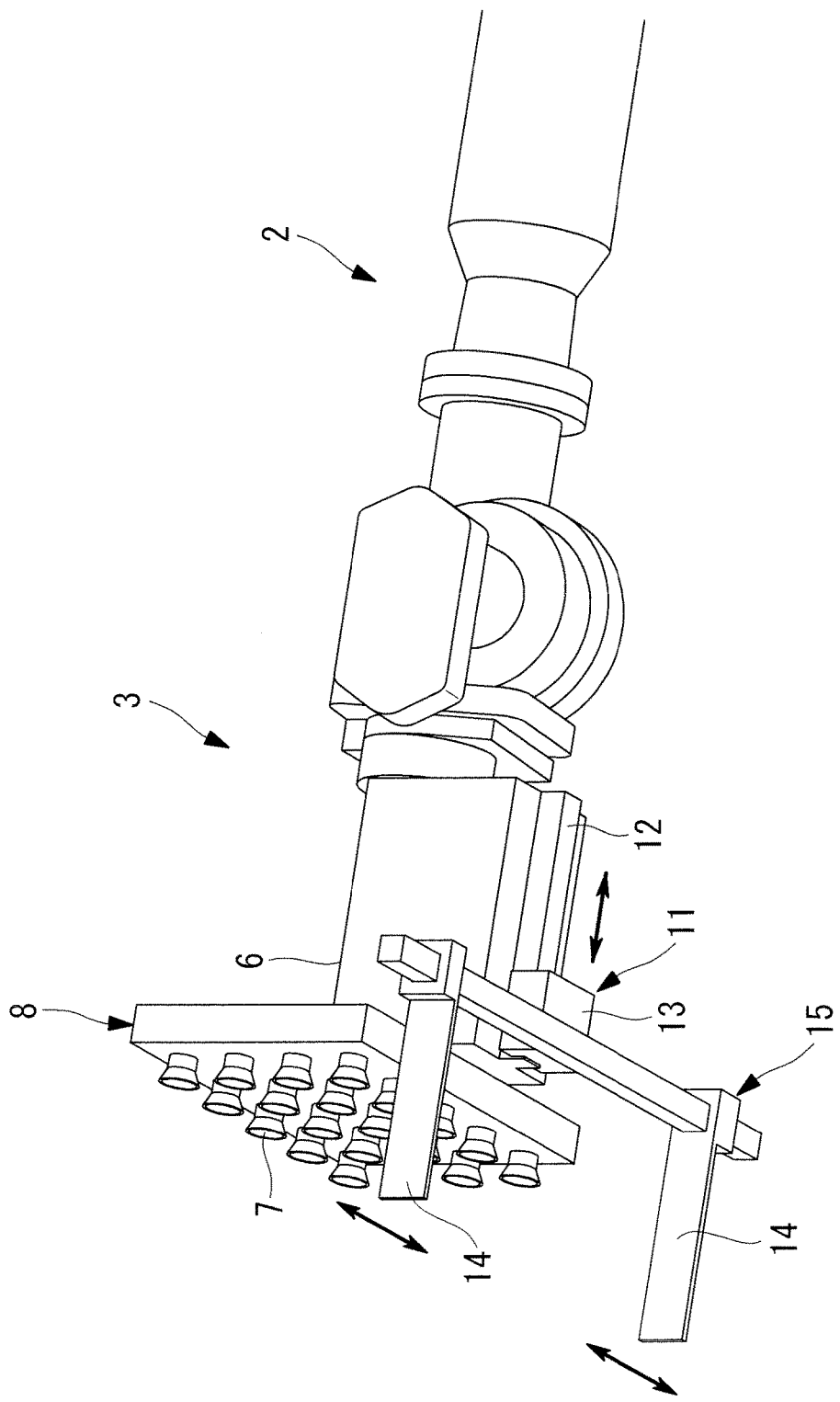
FIG. 14 is a perspective view illustrating a state in which a pair of gripping pieces of the gripper illustrated in FIG. 13 are moved closer to each other.

In the above description, as the second-surface support unit configured to contact and support the second surface B orthogonal to the first surface A, the second-surface suction unit 10 configured to suck the second surface B through the suction pads 9 has been described, but the present invention is not limited thereto. For example, as illustrated in FIGS. 13 and 14, the second-surface support unit may include a pair of gripping pieces 14 configured to be moved forward, by the first actuator, to positions where the gripping pieces 14 facing both side surfaces of the first surface A as two second surfaces B instead of the upper surface, and a gripper drive unit 15 configured to move the gripping pieces 14 in direction closer to each other.

With this configuration, the package X can be pulled out to the front side with the first surface A being sucked by the first-surface suction unit 8, and can be sandwiched when two side surfaces parallel to each other on both sides of the first surface A are held between the pair of gripping pieces 14 in the horizontal direction while the suction by the first-surface suction unit 8 is maintained. Accordingly, the package X can be firmly gripped and transferred.

From the above-described embodiment, the following aspects of the present invention are derived.

A gripper according to an aspect of the present disclosure includes a base to be attached to a wrist tip of a robot, a first-surface suction unit provided on the base and capable of sucking a first surface of a box-shaped package in a first suction direction, a second-surface support unit configured to contact and support a second surface of the package orthogonal to the first surface, and a moving mechanism configured to move the second-surface support unit along a plane parallel to the second surface between a position where the second-surface support unit is retracted toward a base end side relative to a leading end of the first-surface suction unit in the first suction direction and a position where the second-surface support unit is placed forward from the leading end of the first-surface suction unit, while the first-surface suction unit is sucking the first surface.

According to the present aspect, for example, when a package located at the top out of a plurality of box-shaped packages stored in a stack in a rack or a container with only one surface of each package being exposed is gripped, the second-surface support unit is placed at the position where the second-surface support unit is retracted toward the base end side relative to the leading end of the first-surface suction unit, the base is moved by actuation of the robot to place the first-surface suction unit provided on the base to a position where the first-surface suction unit can suck the exposed first surface of the box-shaped package, and the first-surface suction unit is actuated to suck the first surface of the package. Since the second-surface support unit is retracted relative to the first-surface suction unit, the second-surface support unit can be prevented from interfering with the suction of the first surface by the first-surface suction unit.

Then, while the first surface is sucked by the first-surface suction unit, the robot is actuated to retract the first-surface suction unit in the first suction direction so that the sucked package is pulled out to the near side. In this state, the moving mechanism is actuated to move forward the second-surface support unit along the plane parallel to the second surface beyond the leading end of the first-surface suction unit, thereby placing the second-surface support unit at a position where the second-surface support unit can support the second surface. Then, the second-surface support unit is actuated so that the suction of the first surface by the first-surface suction unit and the support of the second surface orthogonal to the first surface by the second-surface support unit are simultaneously performed to more reliably grip the package with the gripper.

Since the second-surface support unit is moved along the plane parallel to the second surface, the interference range of movement of the second-surface support unit can be reduced. In other words, the second-surface support unit does not move in a direction orthogonal to the second surface, and thus, when there is an object near the second surface with only a small space therebetween, the second surface can be reliably supported by the second-surface support unit, and picking of the box-shaped package can be easily performed.

In the above-described aspect, the second-surface support unit may be a second-surface suction unit capable of sucking in a second suction direction orthogonal to the first suction direction.

With this configuration, while the first surface is sucked by the first-surface suction unit and the package is pulled out in the first suction direction, the moving mechanism is actuated to move forward the second-surface suction unit along the plane parallel to the second surface beyond the leading end of the first-surface suction unit, and the second-surface suction unit is actuated while facing the second surface so that the suction of the first surface by the first-surface suction unit and the suction of the second surface orthogonal to the first surface by the second-surface suction unit are simultaneously performed. Accordingly, the package can be more reliably gripped with the gripper.

In the above-described aspect, the moving mechanism may be configured to move the second-surface suction unit to the position where the second-surface support unit is placed forward from the leading end of the first-surface suction unit and then to move the second-surface suction unit along the second suction direction closer to the second surface.

With this configuration, the second-surface suction unit is moved to a position where the second-surface suction unit faces toward the second surface while a gap is maintained between the second surface and the second-surface suction unit, and thereafter, the second-surface suction unit is moved closer to the second surface along the second suction direction. Accordingly, suction can be reliably performed while interference between the second-surface suction unit and the package is avoided.

In the above-described aspect, the moving mechanism may linearly move the second-surface support unit in the first suction direction.

In the above-described aspect, the moving mechanism may be configured to rotate the second-surface support unit about an axis orthogonal to the first suction direction.

In the above-described aspect, the second-surface support unit may include a pair of gripping pieces which are configured to be moved, by the moving mechanism, to positions where the gripping pieces respectively face the two second surfaces orthogonal to the first surface and parallel to each other, and a gripper drive unit configured to move the gripping pieces closer to each other so that the package is held between the gripping pieces.

With this configuration, while the first surface of the package is sucked by the first-surface suction unit and the package is pulled out in the first suction direction, the moving mechanism is actuated to move forward the pair of gripping pieces in the first suction direction beyond the leading end of the first-surface suction unit, and the gripper drive unit is actuated at a position where the pair of gripping pieces face toward the respective second surfaces of the package so that the suction of the first surface by the first-surface suction unit and the holding of the second surfaces orthogonal to the first surface by the pair of gripping pieces are simultaneously performed. Accordingly, the package can be more reliably gripped with the gripper.

A robot system according to another aspect of the present disclosure includes the gripper in any one of the above descriptions, and a robot, wherein the gripper is attached to a wrist tip of the robot through the base.

According to the present aspect, the robot is actuated to perform positioning and movement of the gripper, thereby reliably gripping, for example, a package located at the top of a plurality of box-shaped packages stored in a stack in a rack or a container with only one surface of each package being exposed.

In the above-described aspect, the robot system may further include a sensor configured to detect positions of the first surface and the second surface of the package before the robot positions the first-surface suction unit in a positioning state with respect to the first surface of the package.

With this configuration, the sensor detects the positions of the first surface and the second surface before the robot moves the gripper to position the first-surface suction unit in a positioning state with respect to the first surface of the package, and accordingly, the first-surface suction unit can be appropriately positioned by using the result of the detection.

In other words, the detection of the position of the first surface by the sensor allows the gripper to be placed at a position where the first-surface suction unit can more reliably suck the first surface. In addition, the detection of the position of the second surface by the sensor allows the gripper to be placed at a position where the second-surface support unit does not interfere with the package when the second-surface support unit is moved forward by the moving mechanism while the first surface is sucked by the first-surface suction unit and the following support of the second surface by the second-surface support unit can be reliably performed.

According to the aforementioned aspects, a package stored in a rack or the like with only one surface thereof being exposed can be reliably sucked and transferred.

REFERENCE SIGNS LIST 1 robot system
2 robot
3 gripper
4 sensor
6 base
8 first-surface suction unit
10 second-surface suction unit (second-surface support unit)
11 moving mechanism
14 gripping piece (second-surface support unit)
15 gripper drive unit (second-surface support unit)
A first surface
B second surface
X package

The invention claimed is:
1. A gripper comprising:
a base to be attached to a wrist tip of a robot;
a first-surface suction unit provided on the base and capable of sucking a first surface of a box-shaped package in a first suction direction;
a second-surface support unit configured to contact and support a second surface of the package orthogonal to the first surface; and
a moving mechanism configured to move the second-surface support unit along a plane parallel to the second surface between a position where the second-surface support unit is retracted toward a base end side relative to a leading end of the first-surface suction unit in the first suction direction and a position where the second-surface support unit is placed forward from the leading end of the first-surface suction unit while the first-surface suction unit is sucking the first surface,
wherein:
the box-shaped package is stored in a stack with only the first surface being exposed,
the second-surface support unit is a second-surface suction unit capable of sucking in a second suction direction orthogonal to the first suction direction,
the moving mechanism is configured to rotate the second-surface support unit about an axis orthogonal to the first suction direction, and
the second-surface suction unit is configured to rotate so as to face the second surface exposed from the stack to grip and transfer the box-shaped package after the first-surface suction unit sucks the first surface to pull the box-shaped package, and
the moving mechanism is configured to move the second-surface suction unit to the position where the second-surface support unit is placed forward from the leading end of the first-surface suction unit, and then to move the second-surface suction unit along the second suction direction closer to the second surface.

2. A robot system comprising:
the gripper according to claim 1; and
a robot, wherein the gripper is attached to a wrist tip of the robot through the base.

3. The robot system according to claim 2, further comprising
a sensor configured to detect positions of the first surface and the second surface of the package before the robot positions the first-surface suction unit in a positioning state with respect to the first surface of the package.

4. The gripper according to claim 1, wherein the second-surface suction unit comprises a plurality of suction pads.

* * * * *